United States Patent
Kinoshita

(10) Patent No.: US 8,072,649 B2
(45) Date of Patent: Dec. 6, 2011

(54) IMAGE DISPLAYING MEDIUM, METHOD OF GENERATING COMPOSITE IMAGE DISPLAYING DATA AND IMAGE GENERATING SYSTEM

(75) Inventor: Koji Kinoshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 966 days.

(21) Appl. No.: 11/465,320

(22) Filed: Aug. 17, 2006

(65) Prior Publication Data

US 2007/0047036 A1     Mar. 1, 2007

(30) Foreign Application Priority Data

Sep. 1, 2005  (JP) .................................. 2005-253834

(51) Int. Cl.
  *G06K 15/02* (2006.01)
  *H04N 1/40* (2006.01)
  *G09G 3/00* (2006.01)

(52) U.S. Cl. ........................... 358/3.28; 358/1.2; 345/32

(58) Field of Classification Search .................. 358/540, 358/1.2, 1.9, 3.28, 533; 345/4, 5, 6, 32
See application file for complete search history.

(56) References Cited

U.S. PATENT DOCUMENTS

| | | | | |
|---|---|---|---|---|
| 4,712,909 | A | * | 12/1987 | Oshikoshi ........................ 355/20 |
| 6,101,031 | A | * | 8/2000 | Yoshimura et al. ............ 359/456 |
| 6,768,558 | B1 | | 7/2004 | Yamashita et al. |
| 2003/0016370 | A1 | * | 1/2003 | Goggins ........................ 358/1.2 |
| 2003/0179412 | A1 | * | 9/2003 | Matsunoshita .............. 358/3.28 |
| 2004/0189672 | A1 | * | 9/2004 | Yamazaki et al. ............ 345/619 |
| 2004/0227822 | A1 | * | 11/2004 | Cartlidge et al. ......... 348/207.99 |
| 2005/0200960 | A1 | * | 9/2005 | Tang .............................. 359/619 |
| 2005/0219634 | A1 | * | 10/2005 | Murakami ................... 358/3.28 |
| 2006/0003295 | A1 | * | 1/2006 | Hersch et al. ................. 434/110 |
| 2006/0129489 | A1 | * | 6/2006 | Hersch et al. .................... 705/50 |
| 2007/0086070 | A1 | * | 4/2007 | Wicker ......................... 358/500 |
| 2007/0164558 | A1 | * | 7/2007 | Wicker ........................... 283/94 |

FOREIGN PATENT DOCUMENTS

| | | |
|---|---|---|
| JP | 6-40190 | 2/1994 |
| JP | 2001-144944 | 5/2001 |
| JP | 2001-213042 | 8/2001 |
| JP | 2001-324949 | 11/2001 |
| JP | 2001-358931 | 12/2001 |
| JP | 2003-67293 | 3/2003 |
| JP | 2003-167694 | 6/2003 |
| JP | 2003-196210 | 7/2003 |
| JP | 2004-139158 | 5/2004 |

OTHER PUBLICATIONS

U.S. Appl. No. 11/782,946, filed Jul. 25, 2007, Kinoshita.

* cited by examiner

*Primary Examiner* — James A Thompson
(74) *Attorney, Agent, or Firm* — Oblon, Spivak, McClelland, Maier & Neustadt, L.L.P.

(57) ABSTRACT

An image displaying medium, a method of generating composite image displaying data, and an image generating system are disclosed. A color image on the image displaying medium is composed of plural mesh points whose shape is an ellipse having linearity. The mesh point has, for example, a color of cyan, magenta, yellow, or black in the CMYK system. The color image is a composite image composed of a displaying image and a latent image. When the composite image is viewed through a lenticular lens, a moire pattern having thick vertical lines corresponding to the displaying image and a moire pattern having thin oblique lines corresponding to the latent image appear.

14 Claims, 2 Drawing Sheets

IMAGE DISPLAYING MEDIUM, METHOD OF GENERATING COMPOSITE IMAGE DISPLAYING DATA AND IMAGE GENERATING SYSTEM

BACKGROUND OF THE INVENTION

1. Field of the Invention

The present invention generally relates to an image displaying medium on which a composite image constituted of a displaying image and a latent image is displayed, a method of generating composite image displaying data of the composite image and an image generating system.

2. Description of the Related Art

Due to recent technological progress, it has been difficult to distinguish an original from a fake in which contents are added to the original or a part is deleted from the original. In order to surely distinguish the original from the fake, an image processing apparatus which can detect the fake or falsification of the original on a generally used paper has been disclosed (for example, refer to Patent Document 1). In Patent Document 1, letter information and a background pattern are formed in a document. The background pattern is formed depending on the letter information not to contact the letter information. When some information is added to or deleted from the document, the background pattern overlaps the letter information or a blank appears on the document. Therefore, adding or deleting information to/from the original is distinguished.

Documents such as a personal ID card for a company and securities must be prevented from being faked. In these documents, there is a technology in which a latent image appears when a document is duplicated. Specifically, a latent image is formed on an original by using a color which cannot be recognized with the naked eye, and when the original is duplicated, a letter (latent image) showing the duplication is formed on the duplicated paper. As one of the technologies, a dot pattern displaying medium technology which can easily determine whether a document is an original has been disclosed (for example, refer to Patent Document 2). In Patent Document 2, a dot pattern composed of two or more colors having the same pitch as that of lenses of a lens array is formed. A first letter appears when the lens array focuses on a first position and a second letter appears when the lens array focuses on a second position. That is, the first letter and the second letter appear by shifting the position of the lens array. In addition, in a dot pattern composed of mesh points in which the number of screen lines is 300 lpi (line per inch) or more, the dot pattern is blurred when duplicated because the resolution of a generally used duplicating machine is not large enough. With this, it can be determined whether the document is the original or the fake by a letter condition composed of the dot pattern.

[Patent Document 1] Japanese Laid-Open Patent Application No. 2001-358931 (FIG. 4)

[Patent Document 2] Japanese Laid-Open Patent Application No. 2001-324949 (FIGS. 3 and 6)

However, in Patent Document 2, in order to determine whether the document is the original or the fake, a letter must be formed by mesh points of 300 lpi or more. That is, a latent image must be formed by the mesh points of 300 lpi or more. Consequently, costs and man hours are increased because the latent image must be formed by thin mesh points. In addition, it is difficult to form the latent image by a generally used copying machine or printer, and only when a large quantity of a document is formed, the latent image is formed by using a suitable printing machine having the mesh pints of 300 lpi or more. In addition, in Patent Document 2, since it is determined whether the document is the original by using the blurring condition of the dot pattern, a complicated pattern cannot be used because it is difficult to determine whether the appeared pattern is an original pattern or a pattern which is a blurred form of the original pattern.

SUMMARY OF THE INVENTION

In a preferred embodiment of the present invention, there is provided an image displaying medium, a method of generating composite image displaying data and an image generating system in which a document can be easily determined to be an original or a fake by using many patterns as a latent image while the cost and time are reduced Features and advantages of the present invention are set forth in the description that follows, and in part will become apparent from the description and the accompanying drawings, or may be learned by practice of the invention according to the teachings provided in the description. Features and advantages of the present invention will be realized and attained by an image displaying medium, a method of generating composite image displaying data and an image displaying system particularly pointed out in the specification in such full, clear, concise, and exact terms as to enable a person having ordinary skill in the art to practice the invention.

To achieve one or more of these and other advantages, according to a first aspect of the present invention, there is provided an image displaying medium on which a composite image is displayed. The image displaying medium includes an image displaying medium and a composite image displayed on the image displaying medium. The composite image includes a displaying image composed of mesh points having a first linearity and a latent image composed of mesh points having a second linearity, the latent image being embedded in the displaying image on the image displaying medium. When the first linearity and the second linearity are enlarged by an optical system, the mesh points having the first linearity generate a first moire pattern and the mesh points of the second linearity generate a second moire pattern, the second moire pattern being different from the first moire pattern.

According to a second aspect of the present invention, in the first aspect, the composite image is a color image, each of the mesh points of the displaying image is formed by a different color, one or more of the latent images are embedded in the displaying image, and each of the latent images is formed by mesh points of a different color, and each of the mesh points of the latent image having the different color generates a moire pattern having the different color by the optical system.

According to a third aspect of the present invention, in the first aspect, the moire pattern is formed by line-shaped moire stripes.

According to a fourth aspect of the present invention, in the third aspect, the line-shaped moire stripes include one or more of straight line-shaped moire stripes, curved line-shaped moire stripes, wavy line-shaped moire stripes.

According to a fifth aspect of the present invention, in the first aspect, the mesh points having the first linearity and the mesh points having the second linearity have a shape of an ellipse, a shape of a polygon, or a shape combining the shape of an ellipse and the shape of a polygon.

According to a sixth aspect of the present invention, in the first aspect, the optical system is a lens array of lenses which can enlarge the first and second linearity and the lenses are cylindrical lenses, ellipse lenses, pyramid lenses, polygon lenses, or lenses combined the above lenses.

According to a seventh aspect of the present invention, in the first aspect, the image displaying medium is a paper, or a display including a liquid crystal panel and an electronic paper.

According to an eighth aspect of the present invention, there is provided an image generating system for displaying composite image displaying data on an image displaying medium, the composite image displaying data corresponding to a composite image composed of a displaying image composed of mesh points having a first linearity and a latent image composed of mesh points having a second linearity, the latent image being embedded in the displaying image. The image generating system includes a first unit that generates first data based on image data of the displaying image, the first data corresponding to the mesh points having the first linearity, which first linearity, when enlarged by an optical system, is displayed as a first moire pattern, a second unit that generates second data based on image data of a latent image, the second data corresponding to the mesh points having the second linearity, which second linearity, when enlarged by an optical system, is displayed as a second moire pattern which is different form the first moire pattern, and a third unit that generates composite image displaying data based on the first data and the second data.

According to a ninth aspect of the present invention, in the eighth aspect, the image generating system further includes a print performing unit that converts the composite image displaying data generated by the third unit into print data and prints the print data on the image displaying medium.

According to a tenth aspect of the present invention, there is provided a method of generating composite image displaying data, the composite image displaying data corresponding to a displaying image composed of mesh points having a first linearity and a latent image composed of mesh points having a second linearity, the latent image being embedded in the displaying image. The method includes a first step that generates first data based on image data of the displaying image, the first data corresponding to the mesh points having the first linearity, which first linearity, when enlarged by an optical system, is displayed as a first moire pattern, a second step that generates second data based on image data of a latent image, the second data corresponding to the mesh points having the second linearity, which second linearity, when enlarged by an optical system, is displayed as a second moire pattern which is different form the first moire pattern, and a third step that generates composite image displaying data based on the first data and the second data.

According to an embodiment of the present invention, since the displaying image and the latent image are composed of mesh points, moire patterns do not appear form the composite image at a normal condition; therefore, in the composite image, the latent image cannot be distinguished from the displaying image, that is, the latent image for preventing a fake cannot be recognized. However, when the composite image is viewed through an optical system, a moire pattern corresponding to the displaying image and a moire pattern corresponding to the latent image appear at the same time without shifting the position of the optical system. Therefore, the displaying image can be distinguished from the latent image.

In addition, since the moire pattern of the displaying image is different from the moire pattern of the latent image, the latent image can be clearly recognized, and even if a complicated pattern is used for the latent image, the latent image can be effectively recognized. Further, since the latent image can be easily recognized by using the moire pattern, various patterns such as a pattern composed of, for example, many letters can be used as the latent image. In addition, when coarse mesh points whose interval between the mesh points is large are formed by using a printing machine or a printer, the coarse mesh points can be used as the latent image. Therefore, the cost and time for preventing the fake can be reduced.

According to an embodiment of the present invention, the latent image can be composed of mesh points having a specific color and a moire pattern of the specific color can appear. Therefore, in a case where plural latent images are used, when a different color is used in each of the plural latent images, the plural latent images can be recognized by the respective different colors. Consequently, based on the plural latent images having a different color, it can be surely determined whether the image displaying medium is an original or a fake (duplicated one).

According to an embodiment of the present invention, since the moire pattern is composed of line-shaped moire stripes, a part where the moire pattern has discontinuity or is lost can be easily recognized. When the linearity of the mesh points is lost by the duplication of the original, discontinuity in a line of the moire pattern or a loss of a line of the moire pattern occurs. Therefore, it can be determined whether the image displaying medium is an original or a fake by recognizing the moire pattern.

According to an embodiment of the present invention, the line-shaped moire stripes are straight line-shaped moire stripes, curved line-shaped moire stripes, wavy line-shaped moire stripes, or moire stripes combined the above moire stripes. That is, various types of the line-shaped moire stripes can be used as the moire pattern.

According to an embodiment of the present invention, the mesh points having the first linearity and the mesh points having the second linearity have a shape of an ellipse, a polygon such as a rectangle, a diamond, a triangle, or a shape combined the above shapes. Therefore, the mesh points can generate various moire patterns by enlarging the first linearity and the second linearity by the optical system.

According to an embodiment of the present invention, the optical system is a lens array of lenses which can enlarge the linearity of the mesh points. Therefore, the optical system can be formed by a lens array of cylindrical lenses, ellipse lenses, pyramid lenses, polygon lenses, or a lens array combined the above lens arrays.

According to an embodiment of the present invention, the image displaying medium is a paper, or a display such as a liquid crystal panel and an electronic paper. Therefore, the composite image composed of the displaying image and the latent image can be displayed on any type of the image displaying media.

According to an embodiment of the present invention, an image generating system generates composite image displaying data from image data of the displaying image and the latent image, and displays the composite image on the image displaying medium by the mesh points based on the composite image displaying data. Therefore, the image displaying medium in which moire patterns do not appear at a normal condition can be formed. That is, the image displaying medium from which the latent image for preventing the fake is not recognized at a normal condition can be formed. When the optical system which enlarges the first and second linearity of the mesh points of the displaying image and the latent image is used, a moire pattern of the displaying image and another moire pattern of the latent image appear. Therefore, a complicated pattern can be used as the latent image, that is, the latent image can be formed by coarse mesh points whose interval between the mesh points is large.

According to an embodiment of the present invention, the image generating system converts the composite image displaying data into print data and easily forms an image displaying medium on which the print data are printed by suing a printing machine such as a printer. When an image on the image displaying medium is duplicated by a duplicating machine, the mesh points lose the linearity due to the distortion of the image. When the duplicated image is viewed through the optical system, discontinuity of a line or a loss of a line in the moire pattern occurs. Therefore, it can be easily determined whether a document is an original or a fake (duplicated one).

EFFECT OF THE INVENTION

According to an embodiment of the present invention, since a latent image having a complicated pattern can be formed with a displaying image on an image displaying medium Therefore, it can be determined whether a document is an original or a fake by using the latent image while the cost and the time are reduced.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENT

Best Mode of Carrying Out the Invention

A best mode of carrying out the present invention is described with reference to the accompanying drawings.

Figure 1:
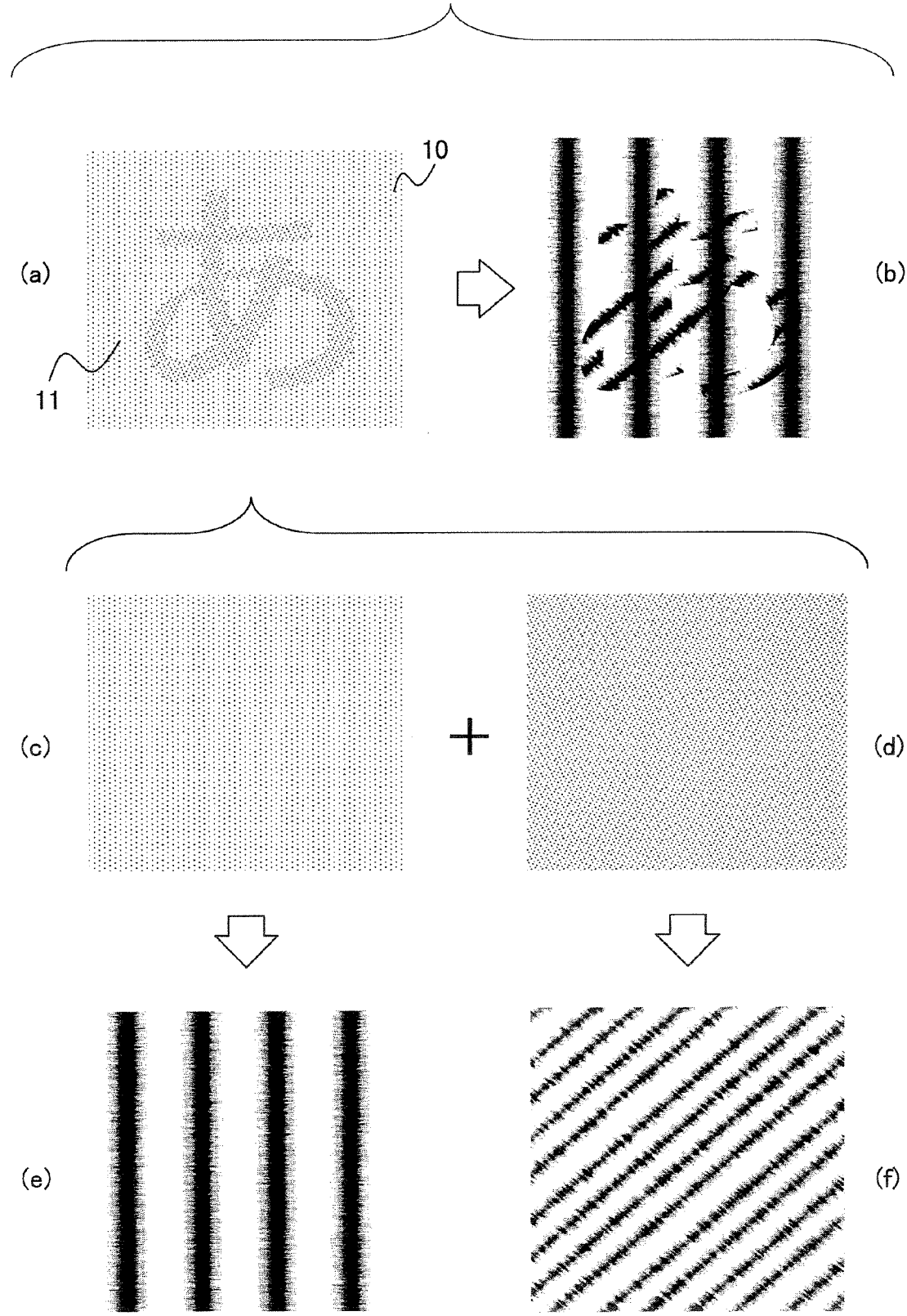
FIG. 1 is a diagram showing an image displaying medium according to an embodiment of the present invention.
Figure 2:
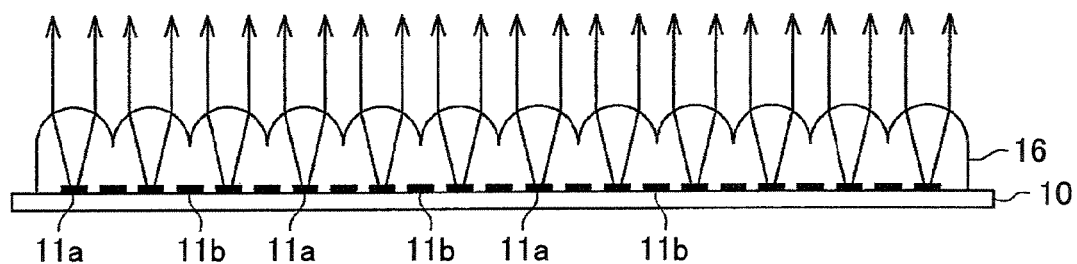
FIG. 2 is a diagram showing a lenticular lens disposed on the image displaying medium according to the embodiment of the present invention.

In an embodiment of the present invention, a paper is used as an image displaying medium. However, the image displaying medium is not limited to paper. FIG. 1 is a diagram showing the image displaying medium according to the embodiment of the present invention. In FIG. 1, (a) shows a composite image on the image displaying medium, (b) shows a moire pattern of the composite image shown in FIG. 1(a) when the composite image is viewed through a lenticular lens, (c) shows a displaying image of the composite image shown in FIG. 1(a), (d) shows a latent image of the composite image shown in FIG. 1(a), (e) shows a moire pattern of the displaying image shown in FIG. 1(c) when the displaying image is viewed through the lenticular lens, and (f) shows a moire pattern of the latent image shown in FIG. 1(d) when the latent image is viewed through the lenticular lens. In FIG. 1(d), the Japanese letter "あ" must be actually shown; however, only mesh points of the latent image are shown. FIG. 2 is a diagram showing a lenticular lens 16 disposed on the image displaying medium (paper) 10 according to the embodiment of the present invention.

In FIG. 1, a color image is used, and in FIG. 1(a), a color image (composite image) is displayed on a paper 10 (image displaying medium). The color image is formed by colors of, for example, cyan, magenta, yellow, and black of the CMYK system, and is composed of plural mesh points 11 whose shape is an ellipse having linearity. When the image shown in FIG. 1(a) is viewed through a lenticular lens 16 (FIG. 2) which is an optical system, as shown in FIG. 1(b), a moire pattern having thick vertical stripes corresponding to the displaying image and a moire pattern having thin oblique stripes corresponding to the latent image appear.

The lenticular lens 16 shown in FIG. 2 is formed by arraying plural cylindrical lenses, portions thereof of which are cut off. Therefore, a mesh point 11a positioned at the center of the cylindrical lens is displayed by being enlarged, and a mesh point 11b positioned at the boundary between the two cylindrical lenses is not displayed. Consequently, a moire pattern can appear depending on the disposition of the mesh points 11a positioned at the center of the cylindrical lenses. In this regard, the size and the slanting angle of moire stripes in the moire pattern can be changed by adjusting the number, the angle, the shape, and the density of the mesh points 11.

The image shown in FIG. 1(a) is a composite image composed of the displaying image shown in FIG. 1(c) and the latent image shown in FIG. 1(d), wherein the latent image is embedded in the displaying image. The displaying image is an image such as letter information, a portrait, and/or a scene on a background pattern. However, in order to make the description simple, in FIG. 1, a specific image is not shown as the displaying image. The displaying image shown in FIG. 1(c) is composed of mesh points having a first linearity, and when the displaying image shown in FIG. 1(c) is viewed through the lenticular lens 16, as shown in FIG. 1(e), the first linearity is enlarged so that a moire pattern having thick vertical stripes appears.

On the other hand, the latent image is an image such as a letter for determining whether a document is an original or a fake and is composed of mesh points having a second linearity, and when the latent image shown in FIG. 1(d) is viewed through the lenticular lens 16, as shown in FIG. 1(f), the second linearity is enlarged so that a moire pattern having thin oblique stripes appears.

In the embodiment of the present invention, as the latent image, a Japanese letter "あ" is used. Since the moire pattern having the thin oblique stripes appears corresponding to the latent image "あ" the Japanese letter "あ" can be recognized as the latent image.

Figure 3:
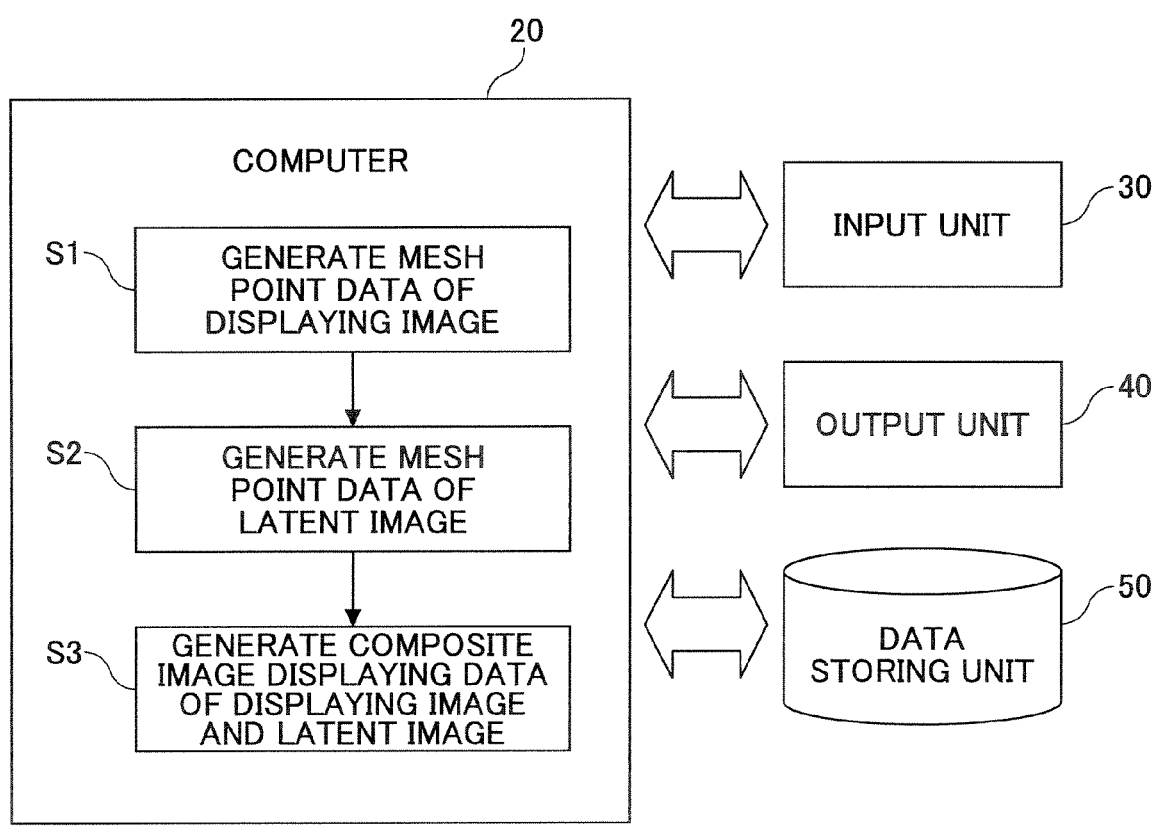
FIG. 3 is a block diagram showing an image generating system according to the embodiment of the present invention.

Next, an image generating system which generates composite image displaying data so as to display the composite image on an image displaying medium (for example, paper) is described. FIG. 3 is a block diagram showing the image generating system according to the embodiment of the present invention. The image generating system is mainly realized by a computer 20. In FIG. 3, a flowchart is shown in the computer 20. The flowchart shows processes that generate the composite image displaying data, which processes are performed by the computer 20.

The computer 20 provides a control unit (not shown). The control unit includes a CPU, a RAM, ROM, and so on, and performs the processes to generate the composite image displaying data and print data. The processes include a first process, a second process, a third process, and a print performing process. Therefore, the control unit functions as a first unit which performs the first process, a second unit which performs the second process, a third unit which performs the third process, and a print performing unit which performs the print performing process.

The first unit generates first data based on image data of the displaying image. The first data correspond to mesh points having a first linearity, which first linearity, when enlarged by an optical system, corresponds to a first moire pattern. The second unit generates second data based on image data of the latent image. The second data correspond to mesh points having a second linearity, which second linearity, when enlarged by an optical system, corresponds to a second moire pattern. The third unit generates composite image displaying data for displaying a composite image on the image displaying medium based on the first data and the second data. The print performing unit converts the composite image displaying data generated by the third unit into print data and prints the print data on the image displaying medium by using a printing machine.

In addition, the computer 20 is connected to an input unit 30, an output unit 40, and a data storing unit 50. The input unit 30 is a unit such as a keyboard and a mouse from which a user instructs operations. The output unit 40 may be, for example, a printing machine such as a printer. The data storing unit 50 stores latent image data and moire data of the latent image.

Next, referring to FIG. 3, exemplary processes which display a composite image on an image displaying medium are described.

First, the control unit in the computer 20 generates mesh point data of a displaying image (step S1). More specifically, the computer 20 specifies an image which is used as a displaying image by an instruction of a user via the input unit 30. For example, when a personal ID card for a company is formed, the user specifies image data of a facial portrait of a person of the personal ID card via the input unit 30. The computer 20 generates mesh point data based on the image data of the specified displaying image, which mesh point data, when viewed through the lenticular lens 16, appear as a thick vertical stripe moire.

Next, the control unit in the computer 20 generates mesh point data of a latent image (step S2). Specifically, the computer 20 obtains data of the latent image from the data storing unit 50. For example, when a personal ID card for a company is formed, image data expressing a letter of the company name may be used as the latent image. The computer 20 generates mesh point data based on the obtained data of the latent image, which mesh point data, when viewed through the lenticular lens 16, appear as a thin oblique stripe moire.

Next, the control unit in the computer 20 generates composite image displaying data of the displaying image and the latent image (step S3). More specifically, the control unit in the computer 20 generates composite image displaying data so that the generated mesh point data of the displaying image and the generated mesh point data of the latent image become the composite image displaying data.

Next, the control unit in the computer 20 generates print data based on the generated composite image displaying data. The control unit in the computer 20 sends the generated print data to the output unit 40, for example, a printing machine. The output unit 40 prints the print data on the image displaying medium. With this, as shown in FIG. 1(*a*), the composite image displayed on the image displaying medium is formed.

As described above, according to one or more embodiments of the present invention, the following effects can be obtained.

First, an image composed of mesh points 11 whose shape is an ellipse having linearity is displayed on the paper 10. When the image is viewed through a lenticular lens 16, a moire pattern having thick vertical stripes corresponding to the displaying image and a moire pattern having thin oblique stripes corresponding to the latent image appear. That is, since the moire pattern corresponding to the displaying image and the moire pattern corresponding to the latent image are composed of mesh points, when the composite image is viewed by the naked eye, the moire patterns do not appear and the latent image for preventing a fake cannot be viewed. However, when the composite image is viewed through the lenticular lens 16 which enlarges the linearity of the mesh points 11a, moire patterns of the displaying image and the latent image appear which are different from each other. Therefore, the displaying image and the latent image can be viewed through the lenticular lens 16. In addition, as the latent image, even if a complicated pattern is used, the latent image can be viewed; therefore, various patterns can be used as the latent image. Further, even if the latent image is composed of coarse mesh points in which the interval between the mesh points is large, which mesh points are formed by a generally used printer, the latent image can be viewed. Therefore, the costs and man hours for preventing a fake can be reduced. In addition, since the coarse mesh points can be used for the latent image, an image having the latent image can be easily printed on an image displaying medium by using, for example, a generally used printing machine.

Second, according to an embodiment of the present invention, as the image displaying medium, paper 10 is used, for example. When an original is duplicated by a copying machine, for example, since the image of the original is distorted, a part of the moire patterns becomes discontinuous or exhibits losses when the composite image is viewed through the lenticular lens 16. Therefore, the duplicated image can be easily detected.

Third, according to an embodiment of the present invention, as the moire pattern, a moire strip having linearity is used. Therefore, the discontinuity and the loss of the moire pattern can be easily detected. Consequently, the duplication of the original can be effectively detected.

The present invention contemplates other embodiments, as will be appreciated by those of ordinary skill in the art.

For example, in an embodiment of the present invention, one latent image is formed in the composite image in which the displaying image is formed. In another embodiment of the invention, however, plural latent images can be formed in the composite image. In such case, for example, plural latent images having a different color can be formed in the composite image. Specifically, a first latent image is formed by a specific color (for example, magenta) and a second latent image is formed by another specific color (for example, cyan). With this, two different moire patterns of two different colors appear.

In an embodiment of the present invention, a color image is displayed by using plural mesh points having corresponding colors by the CMYK system. In another embodiment of the invention, however, the color image can be displayed by using plural mesh points having corresponding colors by the RGB system.

In an embodiment of the present invention, an image on the paper 10 is displayed by mesh points having an ellipse. In another embodiment of the invention, however, the shape of the mesh points can be a circle, a polygon such as a rectangle, a diamond, a triangle, and a shape combining one or more of the foregoing shapes. In such case, different moire patterns between the displaying image and the latent image can be used by using mesh points having different shapes. Specifically, the computer 20 converts the generated composite image displaying data into print data having mesh points whose shape is the circle, the polygon such as the rectangle, the diamond, the triangle, or a shape combining the foregoing shapes.

In an embodiment of the present invention, the computer 20 generates print data from the composite image displaying data and forms an image displaying medium on which the print data are printed by using the output unit 40. In another embodiment of the invention, however, instead of using the printing machine, by causing the output unit 40 to be a displaying unit such as a liquid crystal panel, and an electronic paper, the computer 20 generates display data from the composite image displaying data and forms an image displaying medium on which the display data are displayed on the displaying unit. In such case, the lenticular lens 16 is disposed in front of the displaying unit and the moire patterns are detected.

In an embodiment of the present invention, the moire patterns which appear through the lenticular lens 16 have straight lines as shown in FIG. 1. However, the moire patterns can be formed by, for example, curved lines or wavy lines. That is, when the moire patterns are formed by straight line-shaped moire stripes, curved line-shaped moire stripes, wavy line-shaped moire stripes, or moire stripes combining one or more of the foregoing moire stripes, the discontinuity and the losses of the moire patterns caused by the duplication of the original by for example a copying machine can be easily detected. Therefore, the duplication can be easily detected.

In an embodiment of the present invention, the computer 20 generates composite image displaying data in which moire patterns appear when the composite image displaying data are viewed through the lenticular lens 16 which is an optical system. In another embodiment of the invention, however, instead of using the lenticular lens 16, a lens which can enlarge the linearity of the moire patterns can be used. That is, a cylindrical lens, an ellipse lens, a pyramid lens, a polygon lens, or a lens combining one or more of the foregoing lenses can be used. When a lens is formed by a shape having linearity, a moire pattern is likely to appear because the linearity of the mesh points is enlarged. In such case, the computer 20 generates composite image displaying data so as to form moire patterns corresponding to the lens.

In an embodiment of the present invention, when a personal ID card for a company is formed as the latent image, the company name may be formed on the displaying image of the facial portrait of the person. In another embodiment of the invention, however, as the displaying image, other images such as a letter image and a scene image can be used.

Further, the present invention is not limited to the specifically disclosed embodiment, and variations and modifications may be made without departing from the scope of the present invention.

The present invention is based on Japanese Priority Patent Application No. 2005-253834, filed on Sep. 1, 2005, with the Japanese Patent Office, the entire contents of which are hereby incorporated by reference.

What is claimed is:

1. An image displaying medium on which a single-frame composite image is displayed, comprising:
   an image displaying medium; and
   a single-frame composite image displayed on the image displaying medium,
   wherein the single-frame composite image includes a displaying image including mesh points having a first linearity and a latent image including mesh points having a second linearity, the latent image being embedded in the displaying image on the image displaying medium,
   wherein, when the first linearity and the second linearity are enlarged by an optical system, the mesh points having the first linearity generate a first moire pattern and the mesh points of the second linearity generate a second moire pattern, the second moire pattern being different from the first moire pattern, and
   wherein the optical system that enlarges the first linearity and the second linearity is a lenticular lens comprised of a plurality of cylindrical lenses having arcs smaller than a semicircle, the plurality of cylindrical lenses covering the single-frame composite image.

2. The image displaying medium as claimed in claim 1, wherein
   the single-frame composite image is a color image,
   each of the mesh points of the displaying image is formed by a different color,
   one or more of the latent images are embedded in the displaying image, and each of the latent images is formed by mesh points of a different color, and
   each of the mesh points of the latent image having the different color generates a moire pattern having the different color by the optical system.

3. The image displaying medium as claimed in claim 1, wherein the first and second moire patterns are formed by line-shaped moire stripes.

4. The image displaying medium as claimed in claim 3, wherein:
   the line-shaped moire stripes include one or more of straight line-shaped moire stripes, curved line-shaped moire stripes, and wavy line-shaped moire stripes.

5. The image displaying medium as claimed in claim 1, wherein:
   the mesh points having the first linearity and the mesh points having the second linearity have a shape of an ellipse, a shape of a polygon, or a shape combining the shape of an ellipse and the shape of a polygon.

6. The image displaying medium as claimed in claim 1, wherein the optical system is a lens array of lenses which can enlarge the first and second linearity and the lenses are one of a combination of cylindrical lenses, ellipse lenses, pyramid lenses, and polygon lenses.

7. The image displaying medium as claimed in claim 1, wherein:
   the image displaying medium is a paper, or a display including a liquid crystal panel, and an electronic paper.

8. The image displaying medium as in claim 1, wherein when the first linearity and the second linearity are enlarged by the optical system, the first moire pattern of the displaying image can be recognized from the second moire pattern of the latent image at one viewing angle of the optical system.

9. The image displaying medium as in claim 1, wherein the first moire pattern includes a plurality of vertical lines and the second moire pattern includes a plurality of diagonal lines thinner than the plurality of vertical lines included in the first moire pattern.

10. The image displaying medium as in claim 1, wherein the displaying image is an image of a person and the latent image is an image of a character.

11. The image displaying medium as in claim 1, wherein the optical system includes a flat surface opposite the arcs such that light enters the optical system via the flat surface and emerges via the arcs.

12. An image generating system for displaying single-frame composite image displaying data on an image displaying medium, the single-frame composite image displaying data corresponding to a single-frame composite image including a displaying image including mesh points having a first linearity and a latent image including mesh points having a second linearity, the latent image being embedded in the displaying image, the image generating system comprising:
   a first unit that generates first data based on image data of the displaying image, the first data corresponding to the mesh points having the first linearity, which first linearity, when enlarged by an optical system, is displayed as a first moire pattern;

a second unit that generates second data based on image data of a latent image, the second data corresponding to the mesh points having the second linearity, which second linearity, when enlarged by the optical system, is displayed as a second moire pattern which is different from the first moire pattern; and a third unit that generates single-frame composite image displaying data based on the first data and the second data, wherein the optical system that enlarges the first linearity and the second linearity is a lenticular lens comprised of a plurality of cylindrical lenses having arcs smaller than a semicircle, the plurality of cylindrical lenses covering the single-frame composite image.

13. The image generating system as claimed in claim 12, further comprising:

a print performing unit that converts the single-frame composite image displaying data generated by the third unit into print data and prints the print data on the image displaying medium.

14. A method of generating single-frame composite image displaying data, the single-frame composite image displaying data corresponding to a displaying image including mesh points having a first linearity and a latent image including mesh points having a second linearity, the latent image being embedded in the displaying image, the method comprising:

a first step that generates first data based on image data of the displaying image, the first data corresponding to the mesh points having the first linearity, which first linearity, when enlarged by an optical system, is displayed as a first moire pattern;

a second step that generates second data based on image data of a latent image, the second data corresponding to the mesh points having the second linearity, which second linearity, when enlarged by the optical system, is displayed as a second moire pattern which is different from the first moire pattern; and a third step that generates single-frame composite image displaying data based on the first data and the second data, wherein the optical system that enlarges the first linearity and the second linearity is a lenticular lens comprised of a plurality of cylindrical lenses having arcs smaller than a semicircle, the plurality of cylindrical lenses covering the single-frame composite image.

* * * * *